Feb. 3, 1948.  E. C. WEISKOPF  2,435,300
PROJECTOR FOR MICROSCOPES AND OTHER MAGNIFYING DEVICES
Filed June 2, 1945  8 Sheets-Sheet 1

INVENTOR.
EDWIN C. WEISKOPF
BY Harry Cole
ATTORNEY.

Feb. 3, 1948. E. C. WEISKOPF 2,435,300
PROJECTOR FOR MICROSCOPES AND OTHER MAGNIFYING DEVICES
Filed June 2, 1945 8 Sheets—Sheet 2

INVENTOR.
EDWIN C. WEISKOPF
BY Harry Cohn
ATTORNEY.

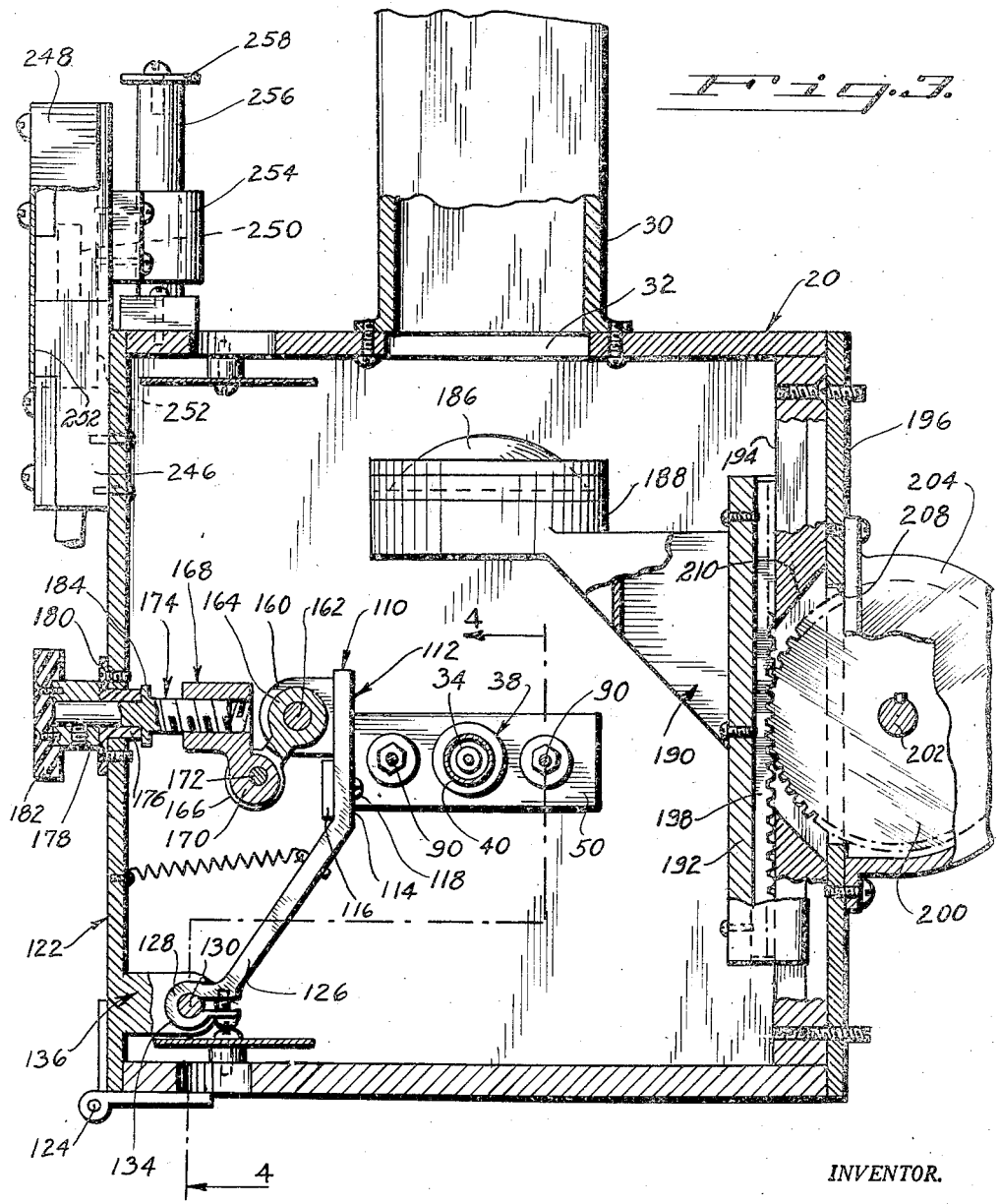

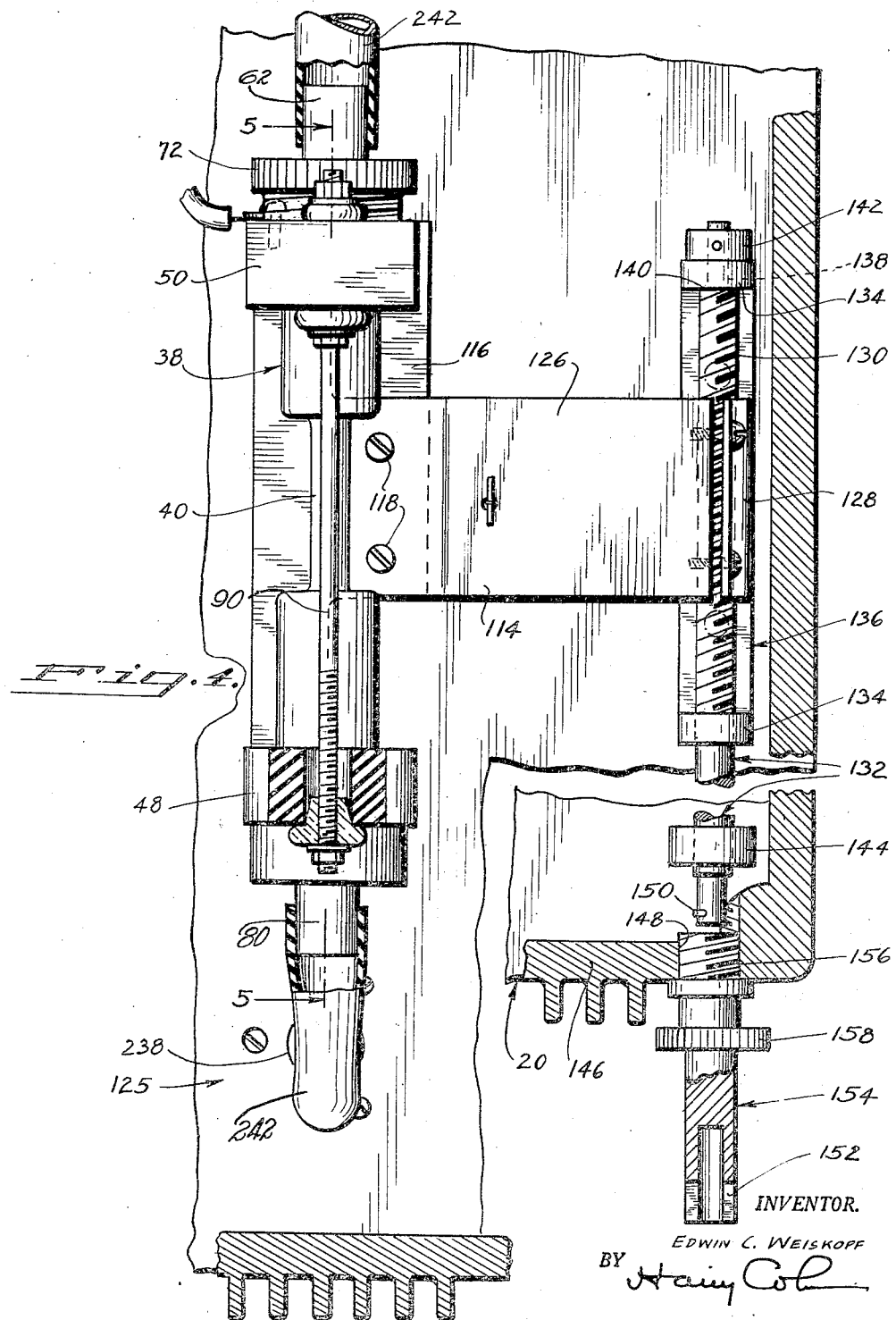

Feb. 3, 1948. E. C. WEISKOPF 2,435,300
PROJECTOR FOR MICROSCOPES AND OTHER MAGNIFYING DEVICES
Filed June 2, 1945 8 Sheets-Sheet 5
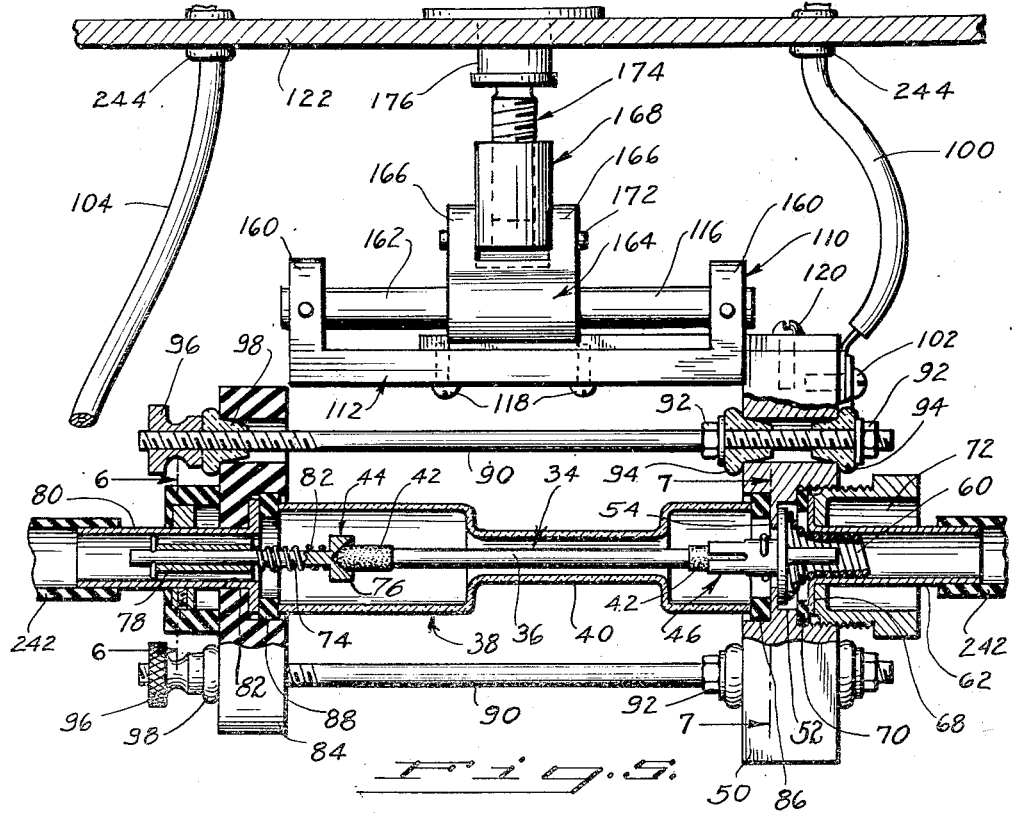
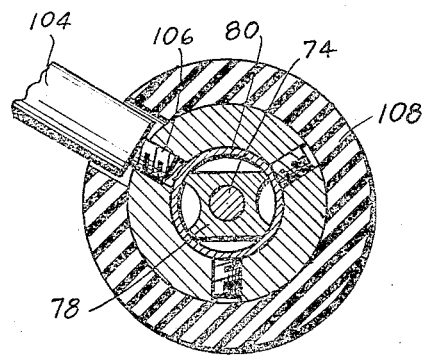
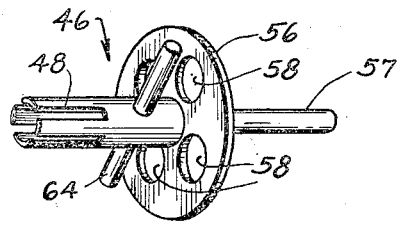
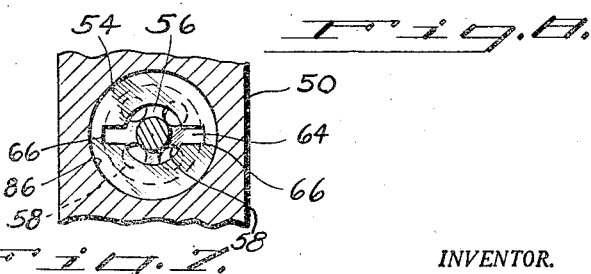
INVENTOR.
EDWIN C. WEISKOPF
BY
ATTORNEY.

Feb. 3, 1948.  E. C. WEISKOPF  2,435,300
PROJECTOR FOR MICROSCOPES AND OTHER MAGNIFYING DEVICES
Filed June 2, 1945   8 Sheets-Sheet 6
Fig. 9.
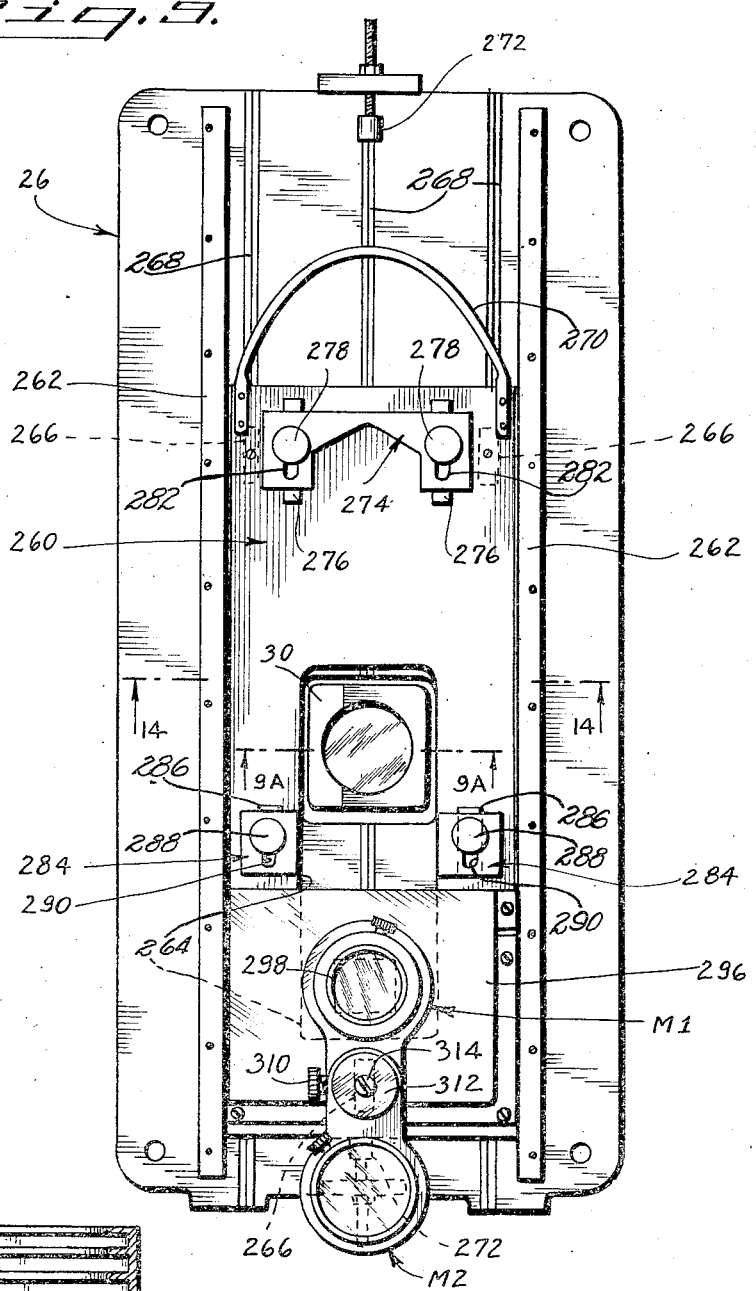
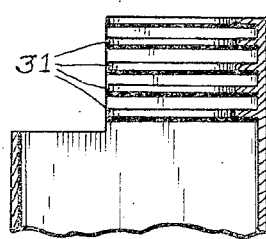
Fig. 9A.
INVENTOR.
EDWIN C. WEISKOPF
BY Harry Cole
ATTORNEY.

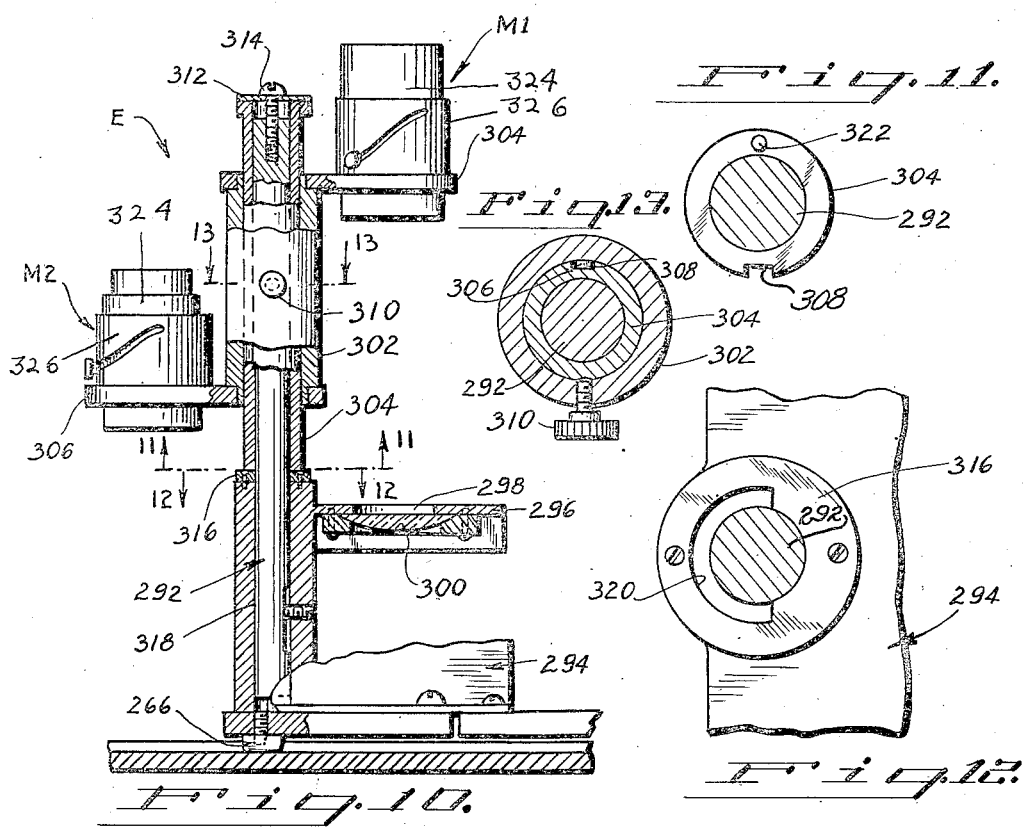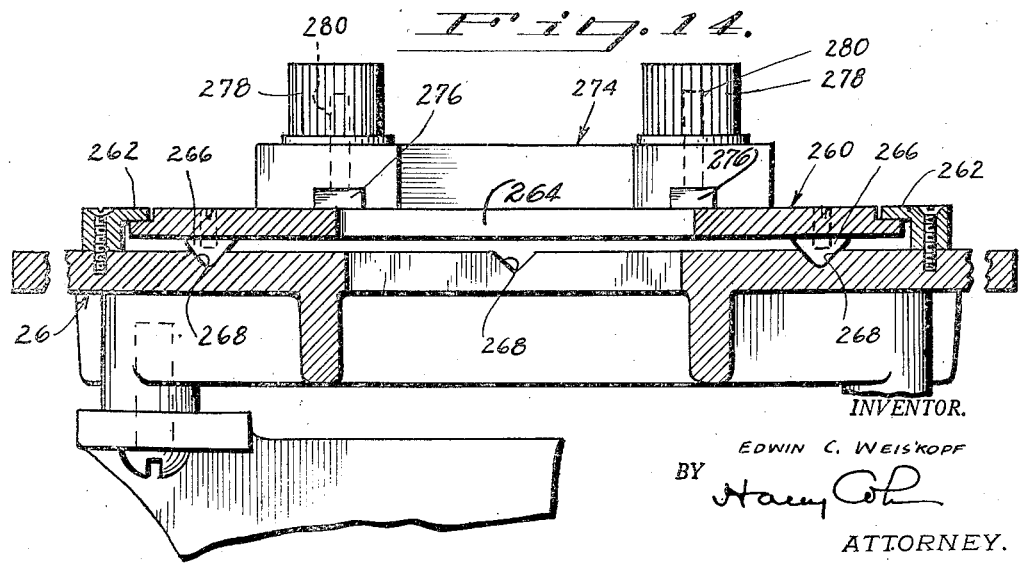

Feb. 3, 1948.  E. C. WEISKOPF  2,435,300
PROJECTOR FOR MICROSCOPES AND OTHER MAGNIFYING DEVICES
Filed June 2, 1945  8 Sheets-Sheet 8
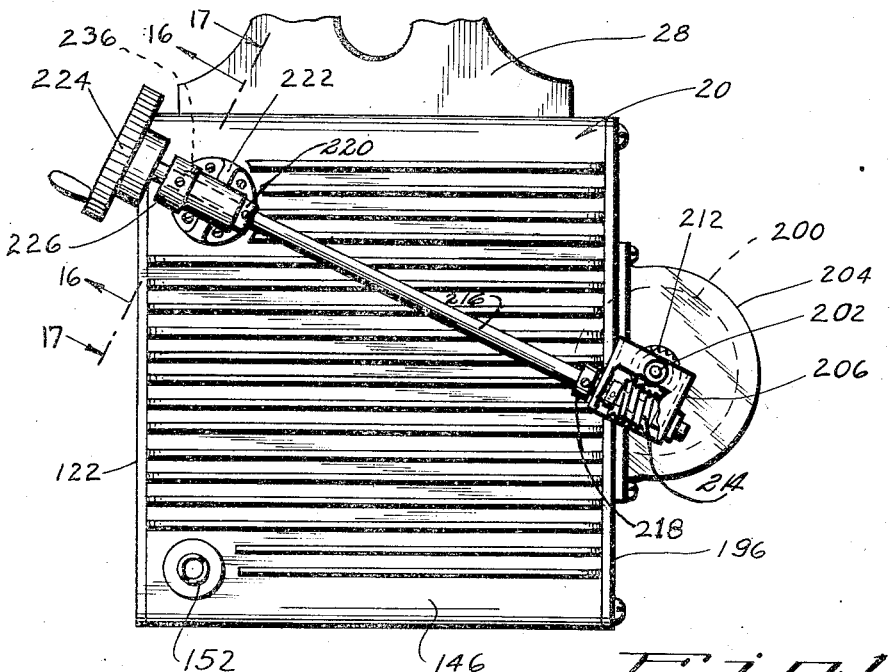
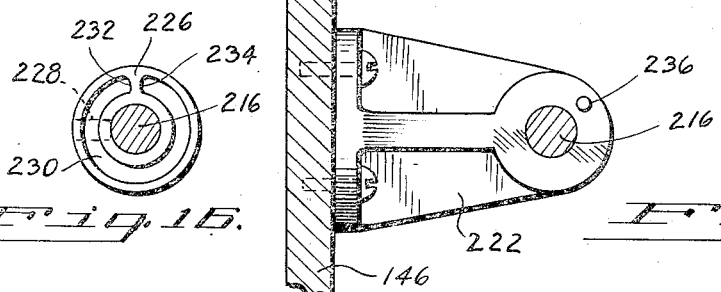
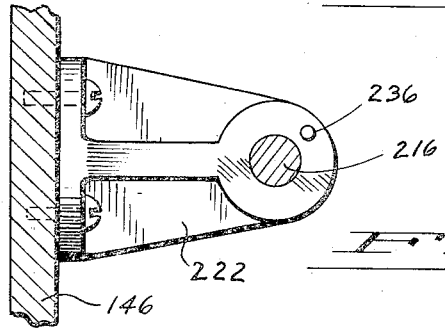
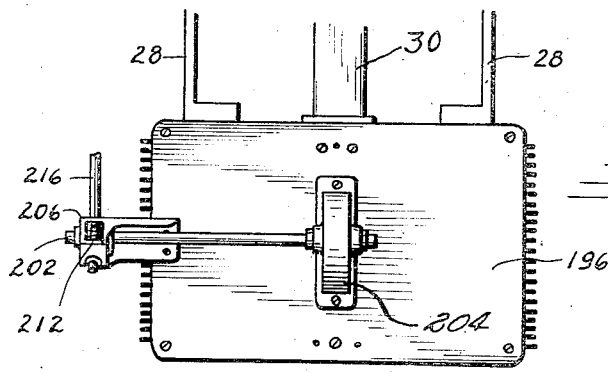
INVENTOR.
EDWIN C. WEISKOPF
BY Harry Cohn
ATTORNEY.

Patented Feb. 3, 1948

2,435,300

UNITED STATES PATENT OFFICE 2,435,300

PROJECTOR FOR MICROSCOPES AND OTHER MAGNIFYING DEVICES

Edwin C. Weiskopf, New York, N. Y.

Application June 2, 1945, Serial No. 597,286

12 Claims. (Cl. 240—2)

This invention relates to projectors for microscopes and other magnifying devices.

The primary object of the present invention is the provision of a light projector for use in conjunction with a microscope for projecting the magnified images of microscope slides onto a screen. The projector is especially useful by pathologists, other members of the medical profession, bacteriologists, pathologists' technicians, and others, in the microscopic examination of tissue or other specimens. The present invention enables microscope slides to be projected through any microscope in such manner that the image of the slide magnified by the microscope can be viewed simultaneously by a group of individuals in any suitable projection room with excellent reproduction of the slide on the screen.

A further object of the invention is the provision of apparatus by which the image of the slide projected through a microscope or other magnifying device can be transmitted alternatively either into a viewing chamber in a lighted room or onto a screen in a darkened projection room. The viewing chamber is preferably such as that disclosed in my application filed December 27, 1944, Serial No. 515,736 of which the present application is a continuation-in-part.

Another object of the invention is the provision of apparatus for selectively projecting differently magnified images, i. e., either images magnified by a microscope or images enlarged by magnifying devices of less magnifying power than a microscope. In this connection, a more specific object of the invention is to provide means for mounting a microscope and one or more magnifying devices of less magnifying power than a microscope in relation to a light projector of such character as to provide enlarged images on a screen with excellent optical reproduction of the specimen carried by the slide.

The above and other objects, features and advantages of the invention will be fully understood from the following description, considered in connection with the accompanying illustrative drawings.

In the drawings:

Fig. 3 is a sectional view on the line 3—3 of Fig. 2;

Fig. 4 is a sectional view on the line 4—4 of Fig. 3;

Fig. 5 is a sectional view on the line 5—5 of Fig. 4;

Figs. 6 and 7 are sectional views on the lines 6—6 and 7—7, respectively, of Fig. 5;

Fig. 8 is a perspective view of a terminal holder for one end of a tubular lamp of the light projector;

Fig. 9 is a top plan view of part of the apparatus, the microscope being omitted;

Fig. 9A is a sectional view on the line 9A—9A of Fig. 9;

Fig. 10 is a view, partly in elevation and partly in section, of the magnifying device;

Figs. 11, 12 and 13 are section views on the lines 11—11, 12—12 and 13—13, respectively, of Fig. 10;

Fig. 14 is a sectional view on the line 14—14 of Fig. 9;

Fig. 15 is a side view of the light projector;

Figs. 16 and 17 are sectional views on the lines 16—16 and 17—17, respectively, of Fig. 15;

Fig. 18 is a rear view of the light projector.

Figure 1:
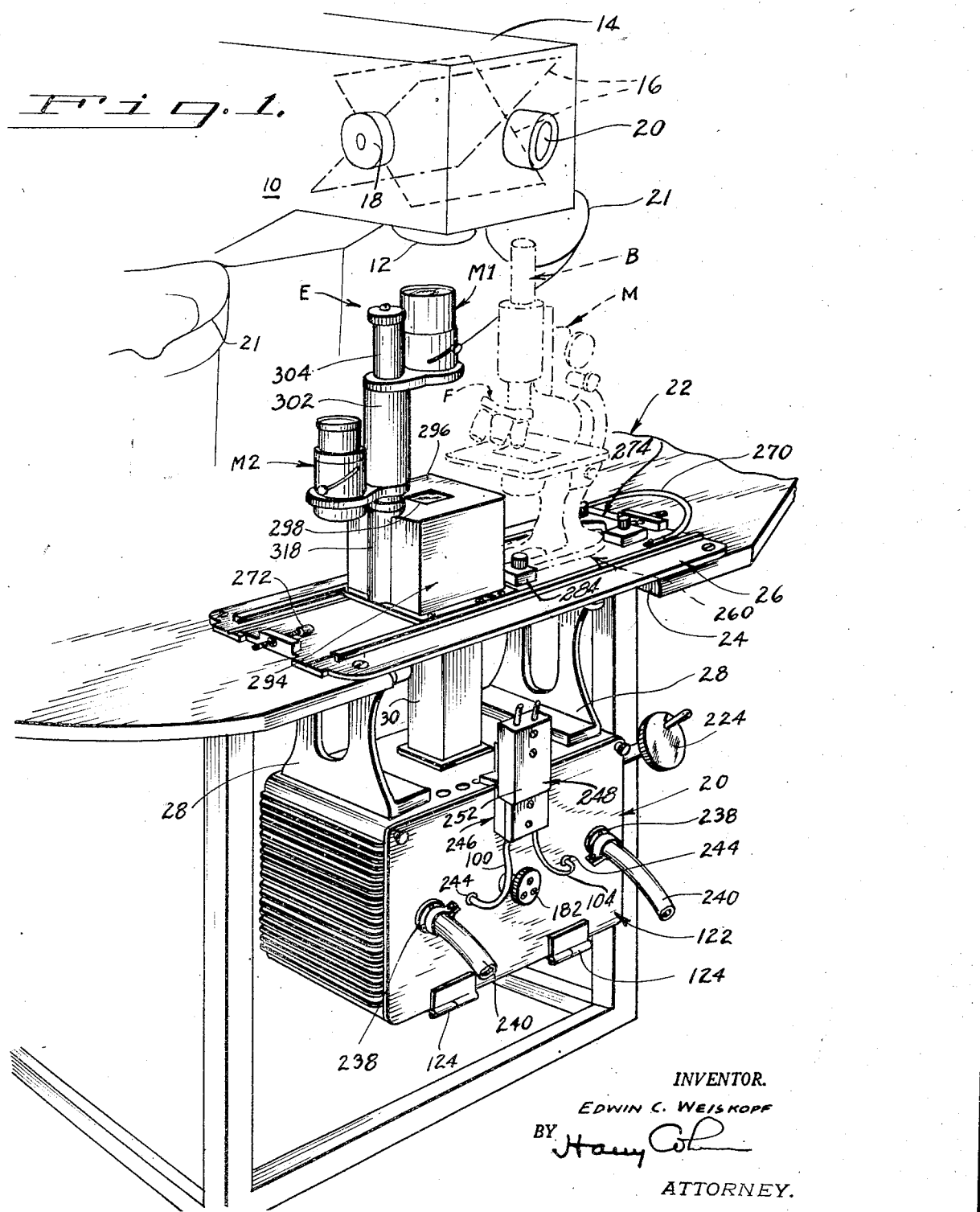
Fig. 1 is a perspective view of projection apparatus embodying the present invention, the microscope, which may be of any suitable type, being shown in dotted lines.

Referring now to the drawings in detail, the projection apparatus of the present invention is illustrated in Fig. 1 in association with a multiple viewing chamber 10 such as that illustrated and described in my above mentioned application, Serial No. 515,736. As here shown and as described in my said application, provision is made for transmitting the image either from the microscope M or from the magnifier E through an opening 12 provided in the light transmitting chamber 14 of the multiple viewing chamber 10. A mirror or other reflector 16 is mounted in chamber 14 and is movable by the knob 18 to either of the two positions illustrated for transmitting the image either into the viewing chamber 10 or through a light outlet 20 onto a screen in a darkened projection room. More particularly, it will be understood that when the reflector 16 is in the position illustrated in dotted lines in Fig. 1, the image is transmitted into the multiple viewing chamber for observation through the viewing tubes 21 with which said viewing chamber is provided; and that when the reflector is in the position illustrated by the dot and dash lines in Fig. 1, the image is transmitted through the light outlet 20 for projection onto a screen in a darkened projection room. It will be understood, however, that the projection apparatus of the present invention can be used without the multiple viewing chamber for projecting the image onto a screen into a darkened projection room, and that in such case, the reflector 16 can be mounted on any suitable support, other than the part 14 of the multiple viewing chamber, for reflecting the image horizontally onto a vertical screen.

Figure 2:
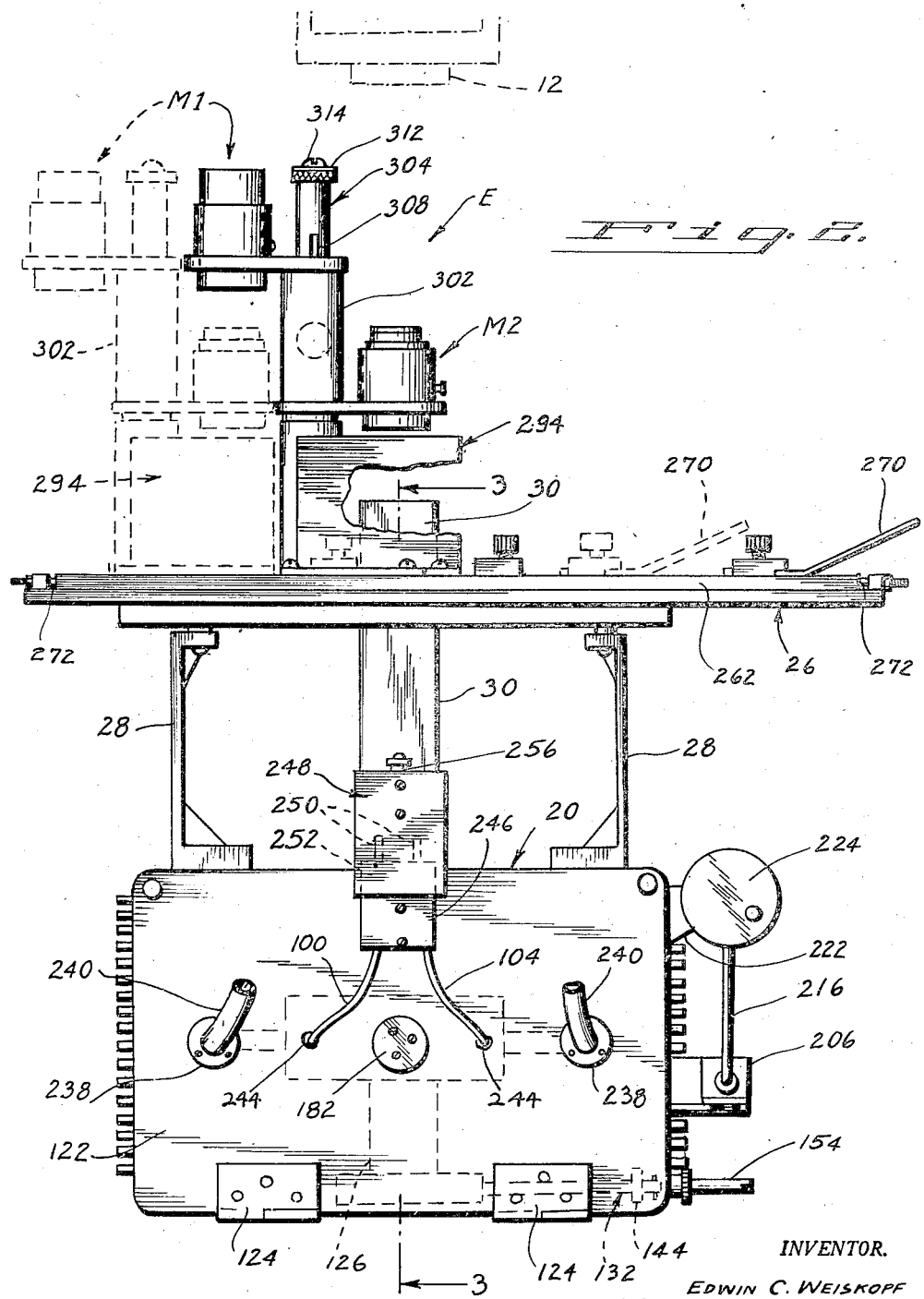
Fig. 2 is a front view of the apparatus.

The projector of the present invention comprises a housing 20 carried by any suitable support, said housing being here shown supported by the table 22 on which the multiple viewing chamber 10 is mounted. More particularly, the top of table 22 is provided with a cutout 24 over which a rigid supporting frame plate 26 is positioned, and the projector housing 20 is suspended from said plate by means of brackets 28 bolted or otherwise secured to the bottom of said plate and to top of said projector housing. A light-outlet tube 30 is connected to the light outlet opening 32 of projector housing 20 and extends through an opening in plate 26 to a point thereabove as shown in Fig. 2, the open upper end of said tube 30 being in registry with the opening 12 through which the light passes to reflector 16. As will be subsequently described, provision is made for positioning either the microscope M or the magnifier E in registry with tube 30 over the open upper end thereof for projecting a magnified image of the slide to the reflector 16. The upper end of tube 30 is provided with a plurality of vertically spaced shelves 31 for supporting one or more color filters which may be used in projecting slides of certain tissue sections which are stained in certain colors.

An important feature of the present invention resides in the provision of means for producing an intense light whereby to obtain proper optical projection of the slide and, in conjunction with said intense light, the provision of means for adjusting the position of the source of light in the projector housing. In order to provide a source of light of high intensity, there is utilized in the light projector of the present invention a high voltage mercury vapor tubular lamp 34. Said lamp 34 is preferably of the type which comprises a quartz capillary tube 36 provided with spaced electrodes at its opposite ends, pools of mercury adjacent said electrodes, and a discharge gas, such as argon. Lamp 34 is water cooled and for that purpose there is provided a water jacket tube 38 of clear glass or other suitable transparent material. Water jacket tube 38 is provided with a constricted portion 40 which extends longitudinally of capillary tube 36 in the portion thereof from which the light is transmitted to the microscope or other magnifying device for illumination of the slide for forming the image. The purpose of providing water jacket tube 38 with said constricted portion 40 is to cause an increase of the velocity of the cooling water around said light emitting part of lamp tube 36, whereby to avoid the formation of air bubbles which would impair the proper light emission characteristics of the lamp. The opposite ends of lamp tube 36 are provided with conductor terminals 42 which are in mechanical and electrical engagement with the companion conducting members and supports 44 and 46, respectively. More particularly, member 46 is formed of metal and is provided with a split sleeve 48 in which one end of lamp tube 36 has a removable sliding fit. Said member 46 is mounted in a metal block 50 which has an opening or bore 52 therethrough. Block 50 has an integral annular ledge 54 which forms an abutment for the disk 56 which is fixed to the centering pin 57 integral with sleeve 48 of member 46, said disk 56 being provided with a plurality of openings 58 to allow the passage of water into the water jacket tube 38 at one end thereof. Disk 56 is held against abutment 54 by a spring 60 which is fixed at one end thereof in the tube 62 and which bears at its other end against said disk. Sleeve 48 is provided with a cross pin 64 which fits in recesses 66 provided in member 50 (Fig 7) for preventing turning of member 46. The inner end of water tube 62 is provided with a flange 68 which is pressed against a rubber washer or packing 70 by a rotary sleeve or gland 72 to form a water tight joint, between tube 62 and member 50 in the bore 52 thereof. The lamp holding member 44 comprises a metal spindle 74 having a cupped end portion 76 in which the adjacent end of the lamp tube 36 is engaged and thereby supported. Spindle 74 is slidable in a metal guide 78 fixed in the metal tube 80. A spring 82 bears against one end of guide 78 and against the end 76 of holding member 44. Tube 80 is mounted in an opening 82 in a holder member 84 formed of insulation material. Rubber washers or packings 86 and 88 are mounted in members 50 and 84, respectively, for engaging the opposite ends of water jacket tube 38 to provide water tight joints between the opposite ends of said tube and said members 50 and 84.

Members 50 and 84 are removably supported on a pair of metal rods 90 which project through openings in said members as illustrated in Fig. 5. Each rod 90 is threaded at its opposite ends and is secured to member 50 by nuts 92 which engage companion insulation sleeves or bushings 94 slidably mounted on the adjacent end of rod 90. Member 84 is adjustable longitudinally of rods 90 and for this purpose the ends of said rods are engaged by nuts 96 which abut the companion insulation sleeves or bushings 98 which are slidably mounted on the ends of the companion rods. It will be understood that by tightening nuts 96 against the companion bushing 98 water jacket tube 38 is clamped at one end thereof against washer 86 and at its opposite end against washer 88. The construction thus described facilitates the assembly of the lamp unit and provide convenient means for replacing the lamp 34 when required. The terminal member 46 is connected to one side of a source of electricity by an electric wire 100 which is connected to member 50 by a terminal screw 102. The other terminal member 44 is connected to the other side of the source of electricity by a wire 104 which has a terminal portion 106 (Fig. 6) which projects through an insulation sleeve 108 and engages metal tube 80 with which member 44 is in electrical conducting relation.

The lamp holder comprising members 50 and 84 and the above described parts associated therewith is adjustably supported in the housing by the adjustable supporting member or bracket 110 which includes a bar 112 having an integral lateral projecting portion 114 to which a plate 116 is fastened in any suitable way as by screws 118. Member 50 of the lamp holder is fastened to plate 116 in any suitable way as by screws 120. The support 110 for the lamp holder is carried by the front pivoted closure or door 122 of housing 20, said door being hinged at the bottom thereof to the housing by hinges 124. Support 112 has a downwardly and forwardly inclined extension 126 (Fig. 3) which is connected to the lower part of the door in the manner hereinafter described, bar 112 being connected to the door at a point above the lower part of the latter by the mechanism hereinafter described, the construction and arrangement being such that said support 112 for the lamp holder is adjustable in a direction longitudinally of the lamp tube 34 and in a direction transversely of the axis of said lamp tube, all for the purposes which will hereinafter be explained. The lower end 128 of extension 126 is curved and internally threaded and is pivotally supported on a screw threaded part 130 of a rotary shaft 132 (Fig. 4).

Shaft 132 is mounted for rotation in bearings 134 formed on a bracket 136 secured to the inner surface of closure 122 near the bottom thereof. Shaft 132 is held against movement longitudinally thereof and for that purpose one end of said shaft is provided with a reduced end portion 138, which is journalled for rotation in the companion bearing 134, thus providing a shoulder 140 which engages said bearing and prevents longitudinal movement of the shaft in one direction. A collar 142 is secured on the reduced end portion 138 of shaft 132 in position adjacent the bearing 134 for preventing longitudinal movement of the shaft in the opposite direction. As illustrated in Fig. 4, shaft 132 is also supported for rotation in a bearing formed in a lug 144 which projects from the inner surface of closure 122. Shaft 132 extends to a point adjacent the inner surface of the side wall 146 of housing 20 in line with an opening 148 provided in said wall. Said shaft is provided with a cross pin 150 adapted to be engaged by the slotted end 152 of an operating key 154. As illustrated in Fig. 4, said key is provided with a threaded end portion 156 which is engaged in and closes opening 148 when said key is not used for rotating shaft 132. Said key is also provided with a knob or finger piece 158 to facilitate the turning of said key for rotating said shaft. It will be understood that when it is desired to rotate shaft 132 for moving extension 126 longitudinally of the threaded portion 130 of shaft 132, key 154 is disengaged from housing 20 and then the split end 152 is inserted through opening 148 of the housing for engaging said split end with cross pin 150 of the shaft.

Bar 112 of the lamp holder support or bracket 110 is provided with forwardly extending end portions 160 in which a guide member 162 constituted by a cylindrical rod is secured. A sleeve 164 is mounted for movement longitudinally of guide rod 162 and is provided with ears 166. An internally threaded sleeve 168 is pivotally connected to the ears 166 of sleeve 164 and for that purpose said sleeve 168 is provided with an extension 170 (Fig. 3) which fits between ears 166 and is pivotally connected to the latter by a pivot pin 172. Sleeve 168 is in screw threaded engagement with the screw threaded part of a spindle 174 which is mounted for rotation in a bearing bushing 176 which is positioned in an opening in closure 122. An operating knob comprising a metal sleeve 178 is secured to the outwardly projecting part 180 of spindle 174 and is provided with an insulation finger piece 182. A collar 184 on spindle 174 prevents longitudinal movement of said spindle in one direction, said collar being in engagement with the inner end of bearing bushing 176, and sleeve 178 of the operating knob engages the outer end of said bearing bushing to prevent longitudinal movement of said spindle in the opposite direction. Thus, by rotating spindle 174, sleeve 168 is moved transversely of the pivotal connection between said sleeve and sleeve 164 whereby support 110 is moved substantially in a horizontal plane in a direction which is transverse to the longitudinal axis of lamp tube 34, that is, in a direction transversely of the path of light from the lamp to the light outlet 32.

In accordance with the present invention and pursuant to another important feature thereof, provision is made for regulating the light which is transmited from lamp 34 to the objectives of the microscope. In this connection, it will be understood that the conventional microscope with which the light projector of the present invention is primarily intended to be used includes a plurality of objective lenses of different magnifying powers carried by a rotary frame F which is operable to position each of said lenses in operative position alignment with the lens tube B and the eye-piece thereof, and it will be understood that said objective lenses of the microscope are of different diameters. By virtue of the feature of the invention which will now be described a maximum quantity of light transmitted from lamp 34 is concentrated on the objective lenses of the microscope, and for this purpose provision is made for narrowing and widening the lens impinging part of the light beam in accordance with the diameters of the different objective lenses of the microscope, said part of the beam being narrowed for the objective lenses of the higher magnifying powers and correspondingly lower diameters, and widened for the objective lenses of the lower magnifying powers and correspondingly larger diameters. In order to accomplish this result a light condensing lens 186 is disposed in the path of light from lamp 34 to outlet 32 and is mounted for movement toward and away from said lamp longitudinally of the light path. As illustrated in Fig. 3, lens 186 is mounted in a holder 188 carried by a vertically adjustable bracket 190. Said bracket includes an integral part 192 slidable on a guide member 194 which is secured to the rear wall 196 of housing 20. Said integral part 192 of bracket 190 is provided with a rack 198 which is engaged by a pinion gear 200 fixed to a rotary shaft 202 mounted for rotation in the gear enclosing housing 204 and in a bearing bracket 206. Gear housing 204 and bracket 206 are secured to the rear wall 196 of projector housing 20. As shown in Fig. 3, gear 200 projects through an opening 208 in rear wall 196 into housing 20 and through an opening 210 in guide member 194 for engagement with rack 198. Shaft 202 is rotated by a gear 212 (Figs. 15 and 18) which is fixed to said shaft and is located in bracket 206. Said gear 212 meshes with and is rotated by a worm gear 214 fixed to one end of a shaft 216. The lower end of said shaft is mounted for rotation in bracket 206 and is held against longitudinal movement by collars 218 and 220 which engage bracket 206 and a bearing bracket 222, respectively. Said bearing bracket 222 is secured to and projects from the side wall 146 of housing 20 for supporting the upper end of shaft 216. The upper end of shaft 216 is provided with an operating wheel or knob 224 disposed substantially in the plane of the front of housing 20 for conveniently rotating said shaft when the operator is in front of said housing. A collar 226 is fixed to shaft 216 in any suitable way as by a set screw 228 and is provided with a circular groove 230 terminating in spaced ends 232 and 234 (Fig. 16). A pin 236 (Fig. 17) projects from bracket 222 into groove 230 for limiting the extent of rotation of shaft 216 in either direction and thereby limiting the extent of vertical movement of lens holder 188 toward and away from lamp 34. The provision in accordance with the present invention for regulating the light beam, by movable lens 186, in accordance with the diameters of the different objective lenses of the microscope enables maximum illumination of the image to be achieved in a simple and convenient manner. Moreover, this feature of the invention eliminates the need for using sub-stage condensors of the microscope. In this connection it will be understood that microscopes of high quality are ordinarily provided with a set of sub-stage condensors which are used with the different objectives, respectively, of the microscope. These sub-stage condensors are not required and preferably are not used when the light projector of the present invention is employed. It will be noted lens 186 is movable axially through a distance of such length that said lens has a considerable range of adjustment to a plurality of positions along the length of the beam corresponding to the diameters or magnifying powers of the plurality of objective lenses respectively, of the microscope. In said different positions lens 186 is effective to control the width of the light beam in accordance with the diameters of said objective lenses, respectively, whereby to provide optimum transmission of light to the objective lenses.

It will be understood that the part of lamp 34 co-extensive with the restricted portion 40 of tube 38 is positioned in centered relation to lens 186 for obtaining optimum transmission of light to said lens and through the latter to the objectives of the microscope or other magnifying devices. This positioning of the lamp is accomplished by adjustment of the lamp holder support 110 in a direction longitudinally of the lamp-tube axis, by operation of knob or wheel 224, and in a direction transversely of said axis by operation of knob 182. It will be observed that both of said knobs are conveniently located and are accessible externally of the housing and are operatively connected to the lamp holder support 110 within the housing so that said support can be safely and accurately adjusted while the lamp is energized.

The door or closure 122 of the projector housing 20 is provided with nipples 238 for connecting water tubes or pipes to the lamp holder. Flexible waterpipes 240 are connected to nipples 238 externally of closure 122 and are connected to a suitable source of supply, preferably as shown in my above mentioned application. Flexible tubes 242 are connected to said nipples at the inner side of said closure, said last mentioned tubes being connected to metal tubes 62 and 80 which communicate with the opposite ends of water jacket tube 38 of lamp 34 in the lamp holder. Wires 100 and 104 which connect lamp 34 to the source of electricity for energizing said lamp extend from the inside of housing 20 to the outside thereof through insulation bushings 244 mounted in openings in closure 122. Said wires 100 and 104 are connected to a connector plug 246 fixed to the front of closure 122 at the upper end thereof. Connector plug 246 forms part of a detachable connector, the other part of which is constituted by a socket member 248. Plug 246 is provided with a pair of prongs 250 which are fixed therein and which project into engagement with socket contacts in socket member 248. It will be understood that socket member 248 is also provided with sockets having electrical socket contacts therein for releasable engagement by the prongs of a plug inserted through the top of socket member 248 for connecting the latter to the source of electric current for energizing the lamp 34.

Plug 246 and socket 248 of the detachable connector are constructed and arranged to prevent opening of door 122 unless socket member 248 is disconnected from plug 246, so that it is impossible to obtain access to the interior of housing 20 unless the source of electricity is disconnected from the apparatus within the housing. For this purpose, in order to electrically engage prongs 250 of plug 246 socket member 248 must be positioned so that a lower part 252 thereof overlaps the upper, front and side portions of plug 246 as illustrated in Fig. 3 and also in Fig. 1. In this position of socket member 248 door 122 can not be opened, since said overlapping lower portion 252 of said socket member prevents outward swinging movement of closure member 122. In order to permit closure member 122 to be swung outwardly for opening the same, it is necessary to move socket member 248 upwardly clear of plug 246. Socket member 248 is secured to a bracket 254 slidable and rotatably mounted on a post 256 fixed to the top of housing 20. Said post is provided with a collar 258 in position to engage the upper end of bracket 254 for limiting the upward movement of said bracket and of the socket member 248 which is carried thereby. Accordingly, in order to open closure 122 it is necessary to move socket member 248 upwardly until bracket 254 engages collar 258 and then to rotate said socket member around post 256 so that the lower part 252 of said socket member is clear of the upwardly projecting prongs 250 of plug 246.

As hereinbefore indicated, the projection apparatus of the present invention includes means for mounting and positioning either a microscope or an optical magnifier or enlarger selectively in registry with the upper end of light tube 30. The means provided for this purpose comprises a plate 260 (Fig. 9) slidably mounted on supporting plate 26 between longitudinally extending guide rails 262 which are secured to the top of plate 26 and overlap the top of plate 260 (Fig. 14). Movable plate 260 is provided with a cut-out 264 through which the upper end portion of tube 30 projects and which allows movement of plate 260 longitudinally of plate 26. Movable plate 260 is provided with a plurality of depending projections 266 which are slidable in companion guide grooves 268 provided in the upper surface of plate 26. Plate 260 is provided with a handle 270 to facilitate sliding of said plate on supporting plate 26. Adjustable stops 272 are provided at the opposite ends of plate 26 in position to engage the adjacent ends of plate 260 for limiting the movement of the latter in either direction longitudinally of plate 26, for positioning plate 260 longitudinally of plate 26. It will be understood that when the right hand end of plate 260, viewing Figs. 1, 2 and 9, is in engagement with the adjacent stop member 272, the magnifier E is in registry with light tube 30 and with opening 12 through which the image of the slide is transmitted to reflector 16, and that when the left hand end of plate 260 is against the adjacent stop member 272, the microscope M is in registry with tube 30 and said opening 12 for transmitting the magnified image of a microslide to mirror 16 for projection by the latter. Plate 260 is provided with means for releasably fastening the base of the microscope to plate 260. As here shown, said means comprises an adjustable member 274 slidable longitudinally of plate 260 on guide bars 276 secured to plate 260. Member 274 is adjustably fastened in position by nuts 278 which engage the upper threaded ends of lugs 280 carried by bars 276 and projecting into slots 282 in member 274. Thus member 274 is adjustable for engaging one end of the forked base of the microscope. The other end of the base of the microscope is engaged at the outer ends of the legs thereof by adjustable members 284 slidably mounted on companion bars 286 fixed to plate 260 and provided with lugs which are engaged by the companion fastening lugs 288, said lugs projecting through slots 290 in fastening members 284.

The enlarging device E comprises magnifiers M1 and M2 mounted on a post 292 (Fig. 10) carried by a frame 294 fastened to the top of slidable plate 260. The top 296 of said frame is provided with a light opening 298 and a lens 300 which register with the light tube 30 when the enlarging device E is in its operative position. It will be understood that each of the magnifying devices M1 and M2 includes a set of lenses for obtaining the desired magnifications of the slides by these magnifiers, respectively. Magnifiers M1 and M2 are turnable about the axis of post 292 for registering said magnifier selectively with lens 300. For this purpose magnifiers M1 and M2 are carried on a rotary sleeve 302, by brackets 304 and 306, respectively, which are fastened to said sleeve and project laterally therefrom in diametrically opposite directions. Sleeve 302 is mounted on an inner sleeve 304 (Figs. 10 and 13), and is provided with a pin 306 which projects into a longitudinal slot 308 in sleeve 304 whereby sleeve 302 is movable longitudinally of sleeve 304 but is held against relative turning movement on said sleeve 304. Thus sleeves 302 and 304 are rotatable as a unit about the longitudinal axis of post 292 while sleeve 302 is movable longitudinally of sleeve 304 and is thereby movable longitudinally of post 292. A set screw 310 is provided for securing sleeve 302 in adjusted position longitudinally of sleeve 304 and correspondingly in adjusted position longitudinally of post 292. A spring washer 312 engaged by the head of a screw 314 threaded into the top of post 292 provides means for pressing the lower end of sleeve 304 frictionally and resiliently against the upper surface of a collar 316 fastened to the top of the frame part 318 in which post 292 is mounted. Collar 316 is provided with a semi-circular groove 320 (Fig. 12) and the lower end of sleeve 304 is provided with a pin 322 (Fig. 11) which fits in said groove 320. It will be understood that when pin 322 abuts the opposite ends of said groove 320 magnifiers M1 and M2 are registered axially with lens 300. Each of the magnifying devices M1 and M2 comprises an adjustable lens tube 324 mounted for turning and sliding movement in a companion stationary tube 326. Said companion tubes 324 and 326 are provided with well known pin and helical slot means for adjusting the lens tube 324 in the companion tube 326 whereby rotation of lens tube 324 results in vertical movement thereof in the companion tube 326 in either direction axially of the axes of the lenses.

The provision of the apparatus of the present invention for positioning either the microscope M and one or more other magnifiers, such as the magnifiers M1 and M2, is highly desirable as it enables differently magnified images to be projected selectively by the light projector of the present invention, for example, a slide or photographic transparency of a cancerous growth can be projected through the magnifiers M1 or M2 followed by the projection through the microscope M of a microslide carrying a microscopic section of said cancerous growth, thus enabling observation and examination of the microscopic section of various areas thereof in comparison with an enlargement of the cancerous growth from which said microscopic section was obtained. Further it will be understood that by adjusting the frame F for varying the magnifying power of the microscope, various areas of the microscopic section carried by the microslide on the microscope can be selectively magnified as may be required for the examination of said section.

Certain features shown or illustrated, but not claimed herein are being claimed in my copending application Serial No. 693,292.

Thus it is seen that the apparatus of the present invention is well adapted for accomplishing the several objects of the invention. It will be understood, however, that while I have shown and described the presently preferred embodiment of my invention, various changes in the details of construction and in the arrangement of parts may be made without departing from the underlying idea or principles of the invention within the scope of the appended claims.

Having thus described my invention, what I claim and desire to secure by Letters Patent is:

1. In a light projector for a microscope, a horizontal support for the microscope, said support having a vertical light tube associated therewith and provided with means for holding the microscope positioned in relation to the outlet end of said tube for the passage of light vertically upward from said tube through the microscope stage and lenses, and a lamp housing carried by said support in position therebelow and having a light outlet in light-transmitting relation to said light tube for the passage of light from said housing through said light tube to the microscope on said support.

2. In a light projector for a microscope, a horizontal support for the microscope, said support having a vertical light tube associated therewith and provided with means for holding the microscope positioned in relation to the outlet end of said tube for the passage of light vertically upward from said tube through the microscope stage and lenses, and a lamp housing supported below said support and having a light outlet in registry with said light tube for the passage of light from said housing through said light tube to the microscope on said support, means in said housing for supporting a source of light in light-transmitting relation to said light-outlet, a condensing lens in the path of the light from said light-source to said light outlet, and means carrying said lens movable longitudinally of said path in opposite directions for adjusting said lens in relation to the light source.

3. In a light projector for a microscope, a horizontal support for the microscope, said support having a vertical light tube associated therewith and provided with means for holding the microscope positioned in relation to the outlet end of said tube for the passage of light vertically upward from said tube through the microscope stage and lenses, and a lamp housing supported below said support and having a light outlet in registry with said light tube for the passage of light from said housing through said light tube to the microscope on said support, means in said housing for supporting a source of light in light-transmitting relation to said light-outlet, a condensing lens positioned in said housing in the path of the light from said light-source to said light outlet, and means in said housing carrying said lens and movable in said housing longitudinally of said path in opposite directions for adjusting said lens in relation to the light source, and means operatively connected to said lens carrying means and accessible externally of said housing for moving said lens carrying means in either of said directions.

4. In a light projector for a microscope and for a different magnifying device, a horizontal support provided with a longitudinal guide for said microscope and said magnifying device, a vertical light tube having its outlet end positioned between the opposite ends of said guide for registering either with the lens system of the microscope or with the lens system of said different magnifying device, a lamp housing having a light-outlet in light-transmitting relation to said light tube for the passage of light from said housing through said light tube.

5. In a light projector for a microscope, a horizontal support for said microscope, a lamp housing positioned below said support and provided with a light outlet, a light-conducting tube extending from said light-outlet through said support for the passage of light from said housing to the microscope on said support, and a condensing lens mounted in said housing in the path of light from the housing to the outlet end of said tube and adjustable longitudinally of said light path in opposite directions.

6. In a light-projector for a microscope, said projector having a lamp housing provided with a movable closure; means including a lamp-holder mounted on said closure at the inner side thereof for supporting an electric lamp in the housing when said closure is in its closed position, an electrical connector carried by said closure on the outer side thereof and electrically connected with said lamp-holder, and a companion electrical connector adapted to be connected to a source of electricity and mounted on said housing and releasably attachable electrically and mechanically with said first mentioned electrical connector for connecting said source thereto and for preventing movement of said closure to its open position when said companion connector is electrically connected to said first mentioned connector.

7. In a light-projector for a microscope, said projector having a lamp housing provided with a movable closure and having a light-outlet; means mounted on said closure at the inner side thereof for supporting a lamp in said housing, said supporting means comprising a screw-threaded rod mounted for rotation and held against longitudinal movement, a bracket pivotally mounted on said rod and having a screw-threaded part in engagement with said rod for movement longitudinally of said rod when the latter is rotated, means carried by said closure and operatively connected to said bracket for moving the same pivotally on said rod, and a holder for said lamp carried by said bracket.

8. In a light-projector for a microscope, said projector having a lamp housing provided with a movable closure and having a light-outlet; means mounted on said closure at the inner side thereof for supporting a lamp in said housing, said supporting means comprising a screw-threaded rod mounted for rotation and held against longitudinal movement, a bracket pivotally mounted on said rod and having a screw-threaded part in engagement with said rod for movement longitudinally of said rod when the latter is rotated, said bracket having a spindle positioned parallel to said threaded rod, a member mounted on said spindle for pivotal movement thereon and for relative movement longitudinally thereof, means carried by said closure and operatively connected to said member for pivotally moving said bracket on said rod, and a holder for said lamp carried by said bracket.

9. In a light-projector for optical magnifying means, said light-projector having a horizontal light-outlet for a vertical beam of light; means for supporting a microscope and another optical magnifying device selectively in light receiving relation to said outlet, said means being mounted for movement horizontally above said light outlet and adapted to carry said microscope and said other magnifying device in positions in a line extending transversely of the light beam, said means being movable in the direction of said line for positioning either said microscope or said other magnifying device in light receiving relation to said outlet.

10. In a light-projector for optical magnifying means, said light-projector having a horizontal light-outlet for a vertical beam of light; means for supporting a microscope and another optical magnifying device selectively in light receiving relation to said outlet, said means being mounted for movement horizontally above said light-outlet and adapted to carry said microscope and said other magnifying device, said means being movable to positions in which either said microscope or said other magnifying device is in light receiving relation to said outlet.

11. In a light-projector for a microscope which is provided with a movable frame carrying a plurality of objective lenses of different magnifying powers, respectively, said projector having means for transmitting a beam of light to any one of the objective lenses of the microscope which is adjusted by movement of said frame to operative position, and means for varying the width of said beam at the point where the beam impinges on the operative objective lens, said last mentioned means comprising a condensing lens through which said beam passes before it impinges on the objective lens of the microscope, and means mounting said condensing lens for axial movement for a distance of such length that said condensing lens is movable to a plurality of different positions along the length of the beam corresponding to the magnifying powers or diameters of said objective lenses, respectively, and in which said condensing lens is effective to control said width of the beam in accordance with the diameters of said objective lenses, respectively.

12. In a light-projector for optical magnifying means, said light-projector having a horizontal light-outlet for a vertical beam of light; slidable means for supporting a microscope and another optical magnifying device selectively in light receiving relation to said outlet, said means being mounted for rectilinear movement horizontally above said light outlet and adapted to carry said microscope and said other magnifying device in positions in a line extending transversely of the light beam, said means being movable in the direction of said line for positioning either said microscope or said other magnifying device in light receiving relation to said outlet.

EDWIN C. WEISKOPF.

REFERENCES CITED

The following references are of record in the file of this patent:

UNITED STATES PATENTS

| Number | Name | Date |
|---|---|---|
| 141,183 | Stout | July 22, 1873 |
| 1,316,050 | Lidberg | Sept 16, 1919 |
| 1,370,315 | Hoberdier | Mar. 1, 1921 |
| 1,433,877 | Exton | Oct. 31, 1922 |
| 1,548,675 | Gayhart | Aug. 4, 1925 |
| 1,786,543 | Marshall | Dec. 30, 1930 |
| 1,969,089 | Merkel | Aug. 7, 1934 |
| 2,094,694 | Bol et al. | Oct. 5, 1937 |
| 2,160,648 | DeJong et al. | May 30, 1939 |
| 2,133,321 | Ehrlich | Oct. 18, 1938 |
| 2,230,573 | Mestre | Feb. 4, 1941 |
| 2,295,046 | Noel | Sept. 8, 1942 |
| 2,313,639 | Hauser | Mar. 9, 1943 |

FOREIGN PATENTS

| Number | Country | Date |
|---|---|---|
| 1,076 | Great Britain | 1910 |